(12) United States Patent
Aoki et al.

(10) Patent No.: US 7,998,633 B2
(45) Date of Patent: Aug. 16, 2011

(54) FUEL CELL SYSTEM

(75) Inventors: Kazuya Aoki, Wako (JP); Tadashi Nomura, Wako (JP); Rieko Okada, Wako (JP); Kiyoshi Kasahara, Wako (JP); Hiromoto Ikada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1289 days.

(21) Appl. No.: 11/607,960

(22) Filed: Dec. 4, 2006

(65) Prior Publication Data
US 2007/0128488 A1   Jun. 7, 2007

(30) Foreign Application Priority Data

Dec. 5, 2005   (JP) .................................. 2005-350160

(51) Int. Cl.
*H01M 8/04* (2006.01)
(52) U.S. Cl. ........ 429/443; 429/427; 429/428; 429/433; 429/434; 429/437; 429/442; 429/456
(58) Field of Classification Search .................... 429/24, 429/427, 428, 433, 434, 436, 437, 442, 456
See application file for complete search history.

(56) References Cited

U.S. PATENT DOCUMENTS

| | | | | |
|---|---|---|---|---|
| 2001/0036566 A1* | 11/2001 | Dekker et al. | ................. | 429/19 |
| 2003/0093950 A1* | 5/2003 | Goebel et al. | .............. | 48/197 R |
| 2004/0106021 A1* | 6/2004 | Kanai et al. | .................... | 429/22 |
| 2005/0181246 A1* | 8/2005 | Nakaji | .............. | 429/13 |
| 2006/0088742 A1* | 4/2006 | Kotani et al. | .................. | 429/13 |

FOREIGN PATENT DOCUMENTS

| | | | |
|---|---|---|---|
| JP | 2000-164233 | A | 6/2000 |
| JP | 2004-95258 | A | 3/2004 |
| JP | 2004-179153 | A | 6/2004 |
| JP | 2004-311229 | A | 11/2004 |
| JP | 2005-129449 | A | 5/2005 |
| JP | 2005-158523 | A | 6/2005 |
| JP | 2006-179346 | A | 7/2006 |
| WO | WO 2004/045012 | * | 5/2004 |

OTHER PUBLICATIONS

Japanese Office Action dated Jun. 22, 2010, issued in corresponding Japanese Patent Application No. 2005-350160.

* cited by examiner

*Primary Examiner* — Patrick Ryan
*Assistant Examiner* — Ben Lewis
(74) *Attorney, Agent, or Firm* — Westerman, Hattori, Daniels & Adrian, LLP

(57) ABSTRACT

A fuel cell system includes a branch anode gas supply pipe in which hydrogen before supplied to a fuel cell flows; and a branch cathode gas supply pipe in which air before supplied to the fuel cell flows. One end on the upstream side of the branch anode gas supply pipe is connected to the upstream side of a regulator in an anode gas supply pipe, and the other end thereof is connected to the branch cathode gas supply pipe via a hydrogen injector. The branch anode gas supply pipe is provided with a hydrogen regulator, which detects a pressure in the branch cathode gas supply pipe as a signal pressure.

8 Claims, 2 Drawing Sheets

FUEL CELL SYSTEM

CROSS-REFERENCE TO RELATED APPLICATION

This application claims the benefit of Japanese Patent Application No. 2005-350160 filed on Dec. 5, 2005, the disclosure of which is incorporated herein by reference.

BACKGROUND OF THE INVENTION

1. Field of the Invention

The present invention relates to a fuel cell system with a combustor provided therein.

2. Description of the Related Art

There has been proposed a technique for a fuel cell system with a combustor provided therein, in which both an anode off-gas exhausted from an anode electrode (a hydrogen electrode) and a cathode off-gas exhausted from a cathode electrode (an air electrode) of a fuel cell are introduced to a combustor, and exhaust heat generated by the combustion reaction of the two gases is introduced in a heat exchanger to heat a cooling medium, and thus warms up the fuel cell at a startup at low temperature (See Japanese Published Patent Application No. 2004-179153, paragraph 0023, FIG. 1). There has been proposed another technique for a fuel cell system with a combustor provided therein, in which an anode off-gas flow passage is provided with a flow passage branching from an upstream side of a fuel cell for introducing an anode gas before being subjected to reaction in a combustor, and likewise, a cathode off-gas flow passage is provided with a flow passage branching from the upstream side of the fuel cell for introducing a cathode gas before subjected to reaction into the combustor (See Japanese Published Patent Application No. 2004-95258, paragraph 0011, FIG. 1).

The technique described in Japanese Published Patent Application No. 2004-179153 uses, in the meantime, the off-gases having passed through a fuel cell for combustion. The use of the off-gases makes it difficult to control combustion at a target temperature, because individual quantities of hydrogen and oxygen in the off-gases cannot be accurately measured. In addition, it is necessary for the off-gases to be subjected to reaction both in a fuel cell and a combustor. Then, each supply quantity of hydrogen and air needs to be increased as compared to a case in which the off-gases are reacted only in a fuel cell, resulting in an increase of energy required during the supply. Also in Japanese Published Patent Application No. 2004-95258, the off-gases are used for combustion, which makes combustion control difficult.

An object of the present invention is to solve the problems described above, and thus to provide a fuel cell system capable of appropriately controlling combustion even when the system starts up at low temperature, and of efficiently warming up a fuel cell thereof.

SUMMARY OF THE INVENTION

A fuel cell system includes a fuel cell for generating electricity with a fuel gas and an oxidant gas supplied therein; a branch fuel gas flow passage branching from a fuel gas supply flow passage in which the fuel gas to be supplied into the fuel cell flows; a fuel off-gas flow passage in which the fuel gas exhausted from the fuel cell flows; a branch oxidant gas flow passage (a first branch oxidant gas flow passage) branching from an oxidant gas supply flow passage in which the oxidant gas to be supplied into the fuel cell flows; an oxidant off-gas flow passage in which the oxidant gas exhausted from the fuel cell flows; a combustor communicating with the branch fuel gas flow passage and the branch oxidant gas flow passage, for combusting the fuel gas and the oxidant gas each before supplied into the fuel cell; a heat exchanger (a first heat exchanger) for transferring heat generated by combustion in the combustor to a heat medium; and a heat medium circulation flow passage for circulating the heat medium between the heat exchanger and the fuel cell.

The fuel gas and the oxidant gas each before supplied into the fuel cell are introduced in the combustor. Namely, because no off-gas is used, each quantity of the fuel gas and the oxidant gas supplied into the combustor can be accurately measured, allowing an easy control of the combustion at a target temperature. In addition, the combustor can be operated even when the fuel cell is not in operation of generating electricity, and can effectively warm up the fuel cell or the like.

DETAILED DESCRIPTION OF EXEMPLARY EMBODIMENTS

First Embodiment

Figure 1:
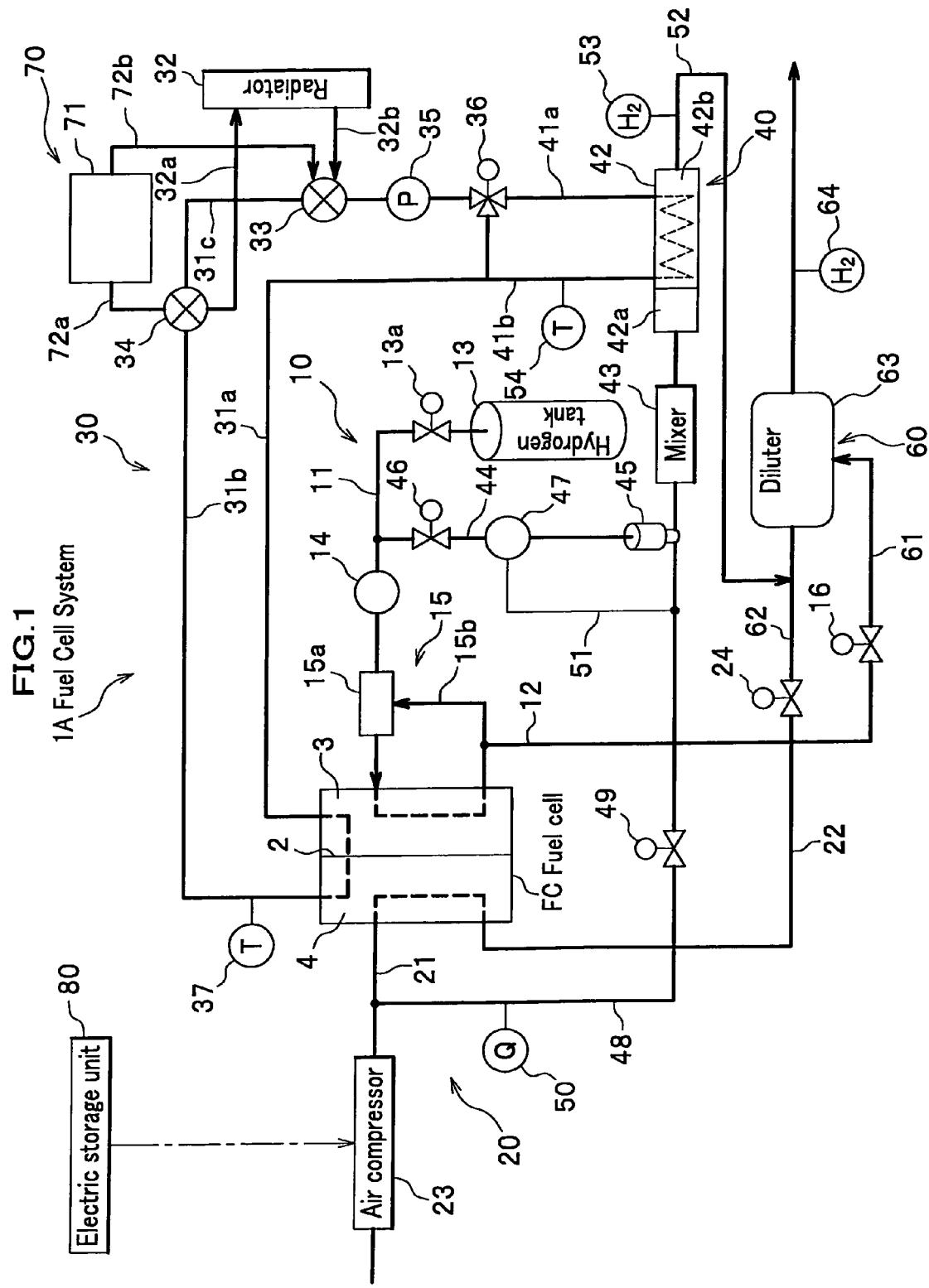
FIG. 1 is a block diagram illustrating an entire fuel cell system according to a first embodiment of the invention.

With reference to FIG. 1, a first embodiment of the present invention will be described. This embodiment is described assuming an example in which a fuel cell system 1A is provided on a fuel cell-driven automobile (vehicle), however, the fuel cell system 1A may also be applied to a marine vessel, an aircraft, or the like.

The fuel cell system 1A includes a fuel cell FC, an anode system 10, a cathode system 20, a cooling system 30, a combustion system 40, and a dilution system 60.

The fuel cell FC is a PEM (Proton Exchange Membrane) type of fuel cell, which is a solid polymer membrane type. The fuel cell FC has a structure including a plurality of single cells piled up in its thickness direction. Each of the single cells includes an MEA (Membrane Electrode Assembly) interposed between conductive separators, the MEA including an electrolyte membrane 2 further interposed between an anode electrode 3 and a cathode electrode 4. Hydrogen as a fuel gas and air as an oxidant gas is supplied into the anode electrode 3 and the cathode electrode 4 of the fuel cell FC, respectively. Thus the hydrogen and oxygen in the air generates electricity through an electrochemical reaction. The generated electricity is supplied to a load such as a driving motor. It is to be noted that, as described hereinafter, a flow passage in which a heat medium can flow is provided in the fuel cell FC so as not to mix up with the flow passages of the hydrogen and the air. For convenience of explanation, FIG. 1 merely shows a schematic structure of the single cell.

The anode system 10 supplies hydrogen to the anode electrode 3 of the fuel cell FC, and also exhausts hydrogen from the anode electrode 3. The anode system 10 includes an anode gas supply pipe (a fuel gas supply flow passage) 11, an anode off-gas pipe (a fuel off-gas flow passage) 12, a hydrogen tank 13, a regulator 14, a hydrogen circulation system 15, and a purge valve 16.

The anode gas supply pipe 11 is a flow passage for supplying hydrogen to the fuel cell FC. One end of the anode gas supply pipe 11 is connected to an inlet of the anode electrode 3 of the fuel cell FC, and the other end thereof is connected to the hydrogen tank 13. The anode off-gas pipe 12 serves as a flow passage for exhausting hydrogen from the fuel cell FC. One end of the anode off-gas pipe 12 is connected to an outlet of the anode electrode 3, and the other end thereof is connected to the purge valve 16.

The hydrogen tank 13 is made of material that can be filled with high purity hydrogen at an extremely high pressure, and is provided with an electromagnetically operating shutoff valve 13a.

The regulator 14 is provided at a suitable position in the anode gas supply pipe 11, and serves as a pressure reduction valve for reducing a high pressure of the hydrogen supplied from the hydrogen tank 13 to a predetermined pressure.

The hydrogen circulation system 15 circulates unreacted hydrogen exhausted from the outlet of the anode electrode 3 of the fuel cell FC back to the inlet of the anode electrode 3, and includes an ejector 15a and a hydrogen circulation pipe 15b. The ejector 15a is provided downstream of the regulator 14 in the anode gas supply pipe 11. One end of the hydrogen circulation pipe 15b is connected to the ejector 15a, and the other end thereof is connected to the anode off-gas pipe 12. With this configuration, hydrogen as a fuel is prevented from being exhausted wastefully, and is effectively used.

The purge valve 16 is a shutoff valve provided in the anode off-gas pipe 12. When the purge valve 16 is opened, impurities accumulated in the anode electrode 3, such as nitrogen and generated water permeated from the cathode electrode 4 through the electrolyte membrane 2 can be discharged. This feature can prevent a hydrogen concentration in the anode electrode 3 from lowering to thereby prevent possible inconveniences such as an impaired performance of the fuel cell FC in generating electricity.

The cathode system 20 supplies air to the cathode electrode 4 of the fuel cell FC, and discharges air or the like from the cathode electrode 4. The cathode system 20 includes a cathode gas supply pipe 21 (an oxidant gas supply flow passage), a cathode off-gas pipe 22 (an oxidant off-gas flow passage), an air compressor 23, and a back pressure valve 24.

The cathode gas supply pipe 21 serves as a flow passage for supplying air to the cathode electrode 4 of the fuel cell FC. One end of the cathode gas supply pipe 21 is connected to an inlet of the cathode electrode 4, and the other end thereof is connected to the air compressor 23. The cathode off-gas pipe 22 is a flow passage for discharging air or the like from the cathode electrode 4. One end of the cathode off-gas pipe 22 is connected to an outlet of the cathode electrode 4, and the other end thereof is connected to the back pressure valve 24.

The air compressor 23 includes a supercharger driven by a motor, and supplies compressed air (outdoor air) to the fuel cell FC via the cathode gas supply pipe 21.

The opening degree of the back pressure valve 24 is controllable. A controller not shown controls the pressure of the air flowing in the cathode electrode 4.

The cooling system 30 radiates heat that the fuel cell FC generates when generating electricity, and includes heat medium pipes 31a, 31b, 31c, a radiator 32, cooling pipes 32a, 32b, switch-over valves 33, 34, a circulation pump 35, a three-way solenoid valve 36, and a temperature sensor 37.

One end of the heat medium pipe 31a is connected to an inlet of a flow passage provided in the fuel cell FC for making a heat medium flow therein, and the other end thereof is connected to the three-way solenoid valve 36. The heat medium used herein is a coolant commonly used for a vehicle. One end of the heat medium pipe 31b is connected to an outlet of the flow passage provided in the fuel cell FC for making the heat medium flow therein, and the other end thereof is connected to the switch-over valve 34. One end of the heat medium pipe 31c is connected to the switch-over valve 34, and the other end thereof is connected to the three-way solenoid valve 36. The heat medium pipe 31c allows the heat medium bypass the radiator 32.

The radiator 32 is a well-known heat exchanger including cooling pipes and fins. The cooling pipe 32a connected to an inlet of the radiator 32 is connected to the switch-over valve 34 described hereinafter, and the cooling pipe 32b connected to an outlet of the radiator 32 is connected to the switch-over valve 33 described hereinafter. Though not shown in the figure, the radiator 32 is provided with an electric fan, which operates when sufficient radiation can not be obtained.

The switch-over valve 33 may be an electromagnetically operating four-way valve, for example, and is connected to a heating pipe 72b connected to a heater 70 described hereinafter. The switch-over valve 34 may also be an electromagnetically operating four-way valve, for example, and is connected to a heating pipe 72a connected to the heater 70.

The circulation pump 35 is provided in the heat medium pipe 31c, and circulates the heat medium mainly between the fuel cell FC and the radiator 32 or between the fuel cell FC and a heat exchanger (a first heat exchanger) 42b described hereinafter.

The three-way solenoid valve 36 can switch over the supply of the heat medium between the normal operation position in which the heat medium on the circulation pump side is supplied to the heat medium pipe 31a, and the warm-up operation position in which the same is supplied to the heat exchanger 42b.

The temperature sensor 37 is provided in the heat medium pipe 31b near an outlet of the fuel cell FC, and detects the temperature of the heat medium exhausted from the fuel cell FC.

The combustion system 40 includes combustion system pipes 41a, 41b; a combustion heater 42 having a combustor 42a and the heat exchanger 42b; a mixer 43; a branch anode gas supply pipe 44; a hydrogen injector 45; a shutoff valve 46; a hydrogen regulator (a pressure control unit) 47; a branch cathode gas supply pipe (a first branch oxidant gas flow passage) 48; a cathode gas flow rate control valve (an oxidant gas flow rate control unit) 49; a cathode gas flow rate sensor 50; a signal pressure supply pipe (a second branch oxidant gas flow passage) 51; a combustor off-gas pipe (a combustor off-gas flow passage) 52; a hydrogen concentration sensor (a hydrogen gas detector) 53; and a temperature sensor 54.

One end of the combustion system pipe 41a is connected to the three-way solenoid valve 36, and the other end thereof is connected to an inlet of the heat exchanger 42b provided in the combustion heater 42a. One end of the combustion system pipe 41b is connected downstream of the three-way solenoid valve 36 in the heat medium pipe 31a, and the other end thereof is connected to an outlet of the heat exchanger 42b. It is to be noted that the combustion system pipes 41a, 41b and the heat medium pipes 31a, 31b, 31c constitute a heat medium circulation path.

The mixer 43 is provided on the upstream side of the combustion heater 42, and supplies a mixed gas generated by mixing hydrogen as a fuel gas and air as an oxidant gas, to the combustor 42a of the combustion heater 42.

The branch anode gas supply pipe 44 is a flow passage branching from the anode gas supply pipe 11 for supplying hydrogen supplied from the hydrogen tank 13 to upstream of the mixer 43. One end of the branch anode gas supply pipe 44 is connected to the upstream side of the regulator 14 provided in the anode gas supply pipe 11, and the other end thereof is connected to the hydrogen injector 45.

The hydrogen injector 45 can electronically control the quantity of hydrogen injection via a controller not shown.

Hydrogen is injected into a flow passage in the branch cathode gas supply pipe 48 described hereinafter.

The shutoff valve 46 is provided upstream of the hydrogen regulator 47 in the branch anode gas supply pipe 44. When the shutoff valve 46 is opened, hydrogen is supplied from the hydrogen tank 13 to the hydrogen injector 45.

The hydrogen regulator 47 detects a pressure in the branch cathode gas supply pipe 48 as a signal pressure, and maintains a predetermined difference between the pressure downstream of the hydrogen regulator 47 and that in the branch cathode gas supply pipe 48.

The branch cathode gas supply pipe 48 is a flow passage branching from the cathode gas supply pipe 21 for supplying air from the air compressor 23 to the mixer 43. One end of the branch cathode gas supply pipe 48 is connected to the cathode gas supply pipe 21, and the other end thereof is connected to the mixer 43.

The cathode gas flow rate control valve 49 is provided in the branch cathode gas supply pipe 48, and can control, in quick response, the supply quantity of the air flowing in the branch cathode gas supply pipe 48 by, for example, a butterfly valve. Additionally, when such a butterfly valve is used, a shutoff valve for the cathode gas may be used upstream of the cathode gas flow rate control valve 49 in the branch cathode gas supply pipe 48. The cathode gas flow rate control valve 49 is preferably a valve which can completely shut off a flow passage such as, for example, a poppet valve. This is because, in a case where, for example, only the fuel cell FC is in operation of generating electricity without the need of supplying air to the branch cathode gas supply pipe 48, if air flows into the branch cathode gas supply pipe 48, the air compressor 23 requires increased energy consumption. Thus, when a valve which can completely shut off a flow passage is used as the cathode gas flow rate control valve 49, it is possible to prevent air from leaking into the branch cathode gas supply pipe 48 to thereby prevent a wasteful energy consumption of the air compressor 23.

The cathode gas flow rate sensor 50 is provided on the upstream side of the cathode gas flow rate control valve 49, and detects a flow rate of the air flowing in the branch cathode gas supply pipe 48. Based on information on the flow rate from the cathode gas flow rate sensor 50, a controller not shown controls the opening of the cathode gas flow rate control valve 49, so that an appropriate quantity of oxygen (air) necessary for the reaction with hydrogen in the combustor 42a can be supplied.

The signal pressure supply pipe 51 branches downstream of the cathode gas flow rate control valve 49 in the branch cathode gas supply pipe 48, and is connected to the hydrogen regulator 47. As described above, the hydrogen regulator 47 detects the pressure in the branch cathode gas supply pipe 48 as a signal pressure, and controls a pressure of the hydrogen supplied to the hydrogen injector 45. Namely, an inlet pressure of the hydrogen injector 45 needs to be set at a higher level than an outlet pressure thereof in order to inject hydrogen therefrom. It is necessary to maintain a predetermined pressure difference between the inlet of the hydrogen injector 45 and the outlet thereof using the hydrogen regulator 47. For example, as the pressure in the branch cathode gas supply pipe 48 decreases, the pressure in the branch fuel gas flow passage 44 on the downstream side of the hydrogen regulator 47 also decreases proportionately. As a result, the predetermined pressure difference between the inlet of the hydrogen injector 45 and the outlet thereof can be constantly maintained.

One end of the combustor off-gas pipe (the combustor off-gas flow passage) 52 is connected to the heat exchanger 42b to communicate therewith, and the other end thereof is connected to a dilution system pipe 62 described hereinafter.

One end of the hydrogen concentration sensor 53 is provided in the combustor off-gas pipe 52, and detects a concentration of hydrogen contained in an exhaust gas generated by catalytic combustion of hydrogen and oxygen in the combustor 42a.

The temperature sensor 54 is provided in the combustion system pipe 41b, and detects a temperature of the heat medium exhausted from the heat exchanger 42b. Based on the temperature information output from the temperature sensor 54, the supply quantity of the hydrogen and the air each supplied to the combustion heater 42 is controlled.

The dilution system 60 includes dilution system pipes 61, 62, a dilutor 63, and a hydrogen concentration sensor 64.

One end of the dilution system pipe 61 is connected to the purge valve 16, and the other end thereof is connected to the diluter 63. One end of the dilution system pipe 62 is connected to the back pressure valve 24, and the other end thereof is connected to the diluter 63.

The diluter 63 mixes the anode off-gas flowing from the dilution system pipe 61 with the cathode off-gas (an oxygen containing gas) flowing from the dilution system pipe 62, and then discharges the diluted gas to the atmosphere.

The fuel cell system 1A according to this embodiment is further includes a heater 70. The heater 70 includes a heating heat exchanger (a second heat exchanger) 71, and heating pipes 72a, 72b.

The heating heat exchanger 71 makes the heat medium heated by the heat exchanger 42b circulate, and radiates the heat for heating the vehicle interior. One end of the heating pipe 72a is connected to the switch-over valve 34, and the other end thereof is connected to an inlet of the heating heat exchanger 71. One end of the heating pipe 72b is connected to the switch-over valve 33, and the other end thereof is connected to an outlet of the heating heat exchanger 71.

The fuel cell system 1A according to this embodiment further includes an electric storage unit 80. The electric storage unit 80 includes a battery such as a lithium ion battery and a capacitor. The electric storage unit 80 is charged by electricity generated by the fuel cell FC, and supplies the electricity to auxiliary units such as the air compressor 23.

Operations in the fuel cell system 1A according to the first embodiment are described below.

When an ignition of a vehicle is turned on, and a control unit, not shown, determines that the fuel cell FC needs warm-up, the switch-over valves 33, 34 are switched over so that the heat medium bypasses the radiator 32 and flows in the heat medium pipe 31c. The three-way solenoid valve 36 is also switched over to the warm-up operation position. Then the shutoff valves 13a, 46 are opened, and hydrogen is injected from the hydrogen injector 45 via the branch anode gas supply pipe 44 into the branch cathode gas supply pipe 48. At the same time, the cathode gas flow rate control valve 49 is set to a predetermined valve opening degree, electricity supplied from the electrical storage unit 80 drives the air compressor 23, and air is supplied via the branch cathode gas supply pipe 48 toward the mixer 43. After the hydrogen and the air is mixed together in the mixer 43, catalytic combustion is performed in the combustor 42a of the combustion heater 42, and a combustion off-gas (an exhaust gas) generated by the catalytic combustion flows through the heat exchanger 42b. Further, the circulation pump 35 is operated, and the heat medium flows from the combustion system pipe 41a through the heat exchanger 42b. Heat is thus exchanged between the combustion off-gas and the heat medium to thereby heat the heat medium. The heated heat medium sequentially flows in the combustion system pipe 41b, the heat medium pipe 31a, and the fuel cell FC, to thereby warm up the fuel cell FC. With the operations described above, even when the fuel cell system 1A is employed at an extremely low temperature, performance of the fuel cell FC in generating electricity can be improved. As a result, the fuel consumption (hydrogen consumption) in this system can be advantageously reduced as compared to that in the conventional fuel cell system. It is to be noted that the supply quantity of the hydrogen and the air each supplied to the combustor 42a can be controlled based on temperature information which is output from the temperature sensor 54.

The combustion off-gas (the exhaust gas) exhausted from the combustor 42a through the heat exchanger 42b flows in the combustor off-gas pipe 52, and then joins the flow passage in the dilution system pipe 62 which is connected upstream of the diluter 63. The combustion off-gas then flows into the diluter 63 together with the cathode off-gas (mainly, air and water) exhausted from the cathode electrode 4 of the fuel cell FC. The combustion off-gas is thus introduced into the diluter 63, so that, even if a combustion trouble occurs in the combustion heater 42, the combustion off-gas is diluted in the diluter 63, preventing high-level hydrogen from being discharged to the atmosphere.

When a controller, not shown, determines, in the meantime, that the fuel cell FC does not need warm-up, the shutoff valve 46 and the cathode gas flow rate control valve 49 are closed to stop supply of hydrogen and air to the mixer 43. After that, if it becomes necessary to cool the fuel cell FC based on the temperature information from the temperature sensor 37, the switch-over valves 33, 34 are switched over so that the heat medium flows through the radiator 32, and the three-way solenoid valve 36 is also switched over to the normal operation position. With the operations, heat radiation and cooling of the heat medium is performed; the heat medium heated by the heat generated when the fuel cell FC generates electricity is sent to the radiator 32; and the heat medium radiates heat and is cooled. The cooled heat medium is returned to the fuel cell FC to cool the fuel cell FC to a predetermined temperature.

The switch-over valves 33, 34 may be switched over so that the heat medium flows through both the heat medium pipe 31c and the heating heat exchanger 71, instead of using all of the heat from the combustion heater 42 for warming up the fuel cell FC. With this configuration, the heat medium heated by the combustion heater 42 flows, on one hand, through the fuel cell FC to warm up the same, and, on the other hand, flows through the heating pipe 72a to the heating heat exchanger 71, in which the heat is radiated to thereby heat the vehicle interior. When the fuel cell FC is being warmed up, while the vehicle interior is also being heated, it is possible to improve performance of the fuel cell FC in generating electricity in a shorter period of time, as compared to a case where the warm-up and the heating is not conducted in parallel (that is, where only the heating is conducted). Thus, heating can be used, even when the system is used at an extremely low temperature at which it is difficult to secure a heat source.

Second Embodiment

Figure 2:
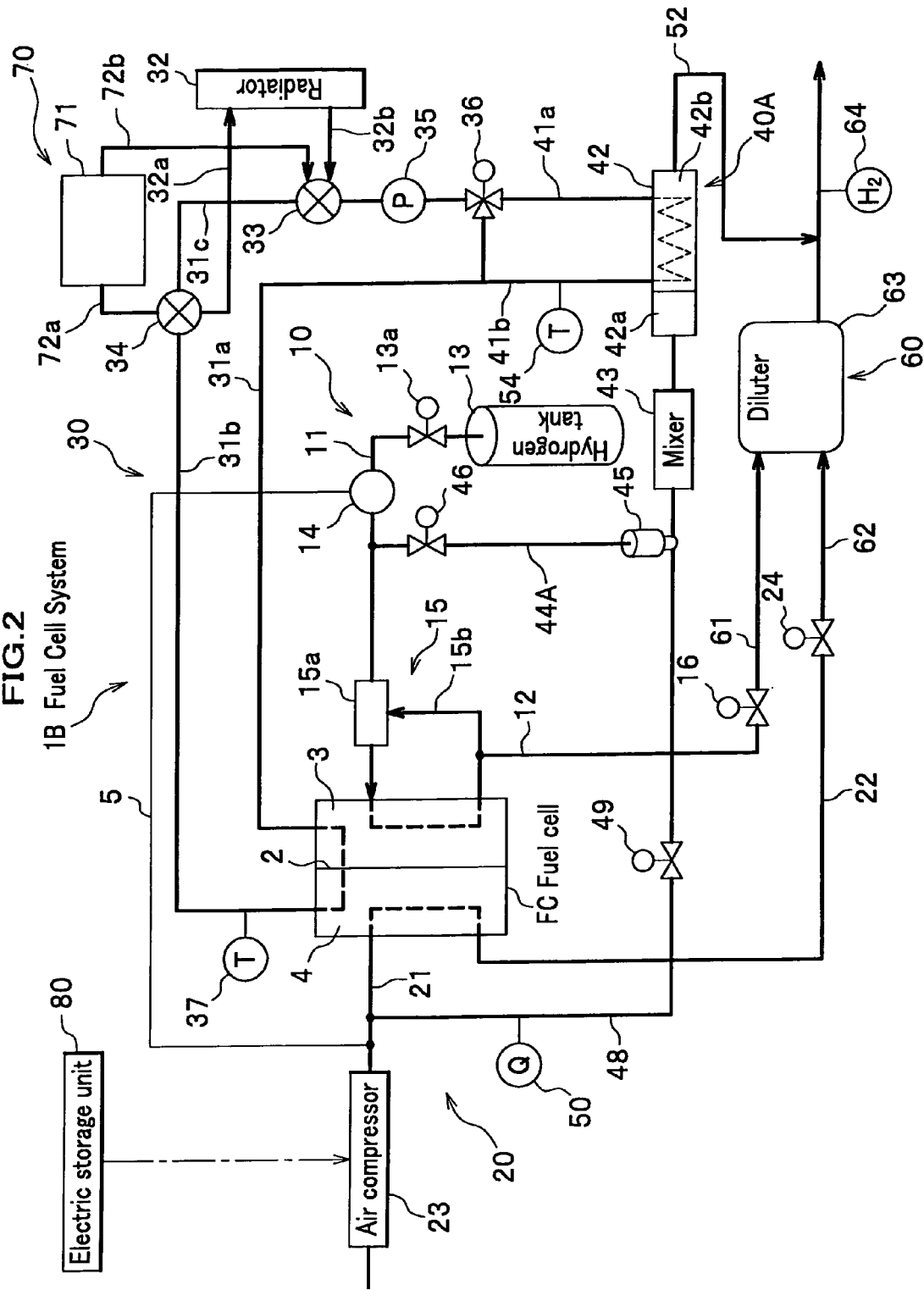
FIG. 2 is a block diagram illustrating an entire fuel cell system according to a second embodiment of the invention.

With reference to FIG. 2, a second embodiment of the present invention will be described. The main difference between the fuel cell system 1B according to the second embodiment and the fuel cell system 1A according to the first embodiment is the configuration of a combustion system 40A. The same reference numerals are herein assigned to the same components in the other configurations, and the descriptions are omitted herefrom.

The combustion system 40A includes a branch anode gas supply pipe 44A. The branch anode gas supply pipe 44A includes a hydrogen injector 45 and a shutoff valve 46, like those in the first embodiment. One end of the branch anode gas supply pipe 44A is connected to the downstream side of a regulator 14 in an anode gas supply pipe 11, and the other end thereof is connected to a branch cathode gas supply pipe 48 via the hydrogen injector 45. The regulator 14 provided in the anode gas supply pipe 11 detects a pressure of a cathode electrode 4 as a signal pressure via a signal pressure pipe 5 branching from a cathode gas supply pipe 21, and maintains a predetermined pressure difference between the cathode electrode 4 side and the anode electrode 3 side downstream of the regulator 14. As described above, the most upstream point of the branch anode gas supply pipe 44A is connected downstream of the regulator 14, so that it is possible to set a predetermined pressure difference between the branch anode gas supply pipe 44A and the cathode electrode 4. Thus hydrogen can be injected as one desires, utilizing a cathode gas flow rate control valve 49 and the hydrogen injector 45. In the second embodiment, the system can be therefore simplified, without using the hydrogen regulator 47 and the signal pressure supply pipe 51 as in the first embodiment.

Additionally, in the second embodiment, a combustor off-gas pipe 52 is provided so that a flow passage thereof joins a flow passage flown from the diluter 63, namely, on the downstream side of the diluter 63. A hydrogen concentration sensor 64 is also provided on the downstream side of the aforementioned junction. With this configuration, the hydrogen concentration sensor for detecting a hydrogen concentration in a combustion off-gas exhausted from a combustor 42a and that for detecting a hydrogen concentration in the off-gas exhausted from the fuel cell FC can be combined into one sensor, which allows a reduction in the number of components.

In this embodiment, the heating heat exchanger is described as the second heat exchanger, however, the embodiment is not limited to this configuration. The second heat exchanger may be any other component without limitation, as long as the component can exchange heat with a component other than the fuel cell FC.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:
1. A fuel cell system comprising:
a fuel cell for generating electricity from a fuel gas and an oxidant gas supplied thereto;
a fuel gas supply passage connecting a fuel gas supply with the fuel cell;
an oxidant gas supply passage connecting an oxidant gas supply with the fuel cell;
a combustor for combusting fuel gas and oxidant gas;
a branch fuel gas flow passage connecting the fuel gas supply passage to the combustor;
a first branch oxidant gas flow passage connecting the oxidant gas supply passage, at a point upstream of said fuel cell, to the combustor;

a fuel off-gas flow passage for exhausting fuel gas from the fuel cell;

an oxidant off-gas flow passage for exhausting oxidant gas from the fuel cell;

a first heat exchanger associated with said combustor for transferring heat generated by combustion in the combustor to a heat transfer medium; and a heat transfer medium circulation passage connecting the first heat exchanger to the fuel cell for circulating the heat transfer medium between the first heat exchanger and the fuel cell, wherein the branch fuel gas flow passage comprises:

a fuel gas supply quantity control unit for controlling a supply quantity of the fuel gas to be supplied into the combustor; and a pressure control unit provided upstream of the fuel gas supply quantity control unit, for controlling a pressure in the fuel gas according to a pressure in the first branch oxidant gas flow passage, and wherein the pressure control unit is provided in a second branch oxidant gas flow passage branching from the first branch oxidant gas flow passage, and detects the pressure in the first branch oxidant gas flow passage as a signal pressure.

2. The fuel cell system according to claim 1, further comprising an oxidant gas flow rate control unit in the first branch oxidant gas flow passage for controlling a flow rate of the oxidant gas flowing in the first branch oxidant gas flow passage.

3. The fuel cell system according to claim 2, wherein the heat transfer medium circulation flow passage is communicated with a second heat exchanger used for warming up a component other than the fuel cell.

4. The fuel cell system according to claim 2, wherein a combustor off-gas flow passage in which a combustor off-gas exhausted from the combustor flows joins downstream of a junction at which the fuel off-gas flow passage and the oxidant off-gas flow passage join, and a fuel gas detector, for detecting a hydrogen concentration in the fuel gas, is located further downstream from the junction.

5. The fuel cell system according to claim 2, wherein the fuel off-gas flow passage and the oxidant off-gas flow passage are each communicated with a diluter, and a combustor off-gas flow passage, in which combustor off-gas exhausted from the combustor flows, is communicated to the diluter upstream thereof.

6. The fuel cell system according to claim 1, wherein the heat transfer medium circulation flow passage is communicated with a second heat exchanger used for warming up a component other than the fuel cell.

7. The fuel cell system according to claim 1, wherein a combustor off-gas flow passage in which a combustor off-gas exhausted from the combustor flows joins downstream of a junction at which the fuel off-gas flow passage and the oxidant off-gas flow passage join, and a fuel gas detector, for detecting a hydrogen concentration in the fuel gas, is located further downstream from the junction.

8. The fuel cell system according to claim 1, wherein the fuel off-gas flow passage and the oxidant off-gas flow passage are each communicated with a diluter, and a combustor off-gas flow passage, in which combustor off-gas exhausted from the combustor flows, is communicated to the diluter upstream thereof.

* * * * *